Feb. 13, 1934. J. A. FITCH ET AL 1,946,618
NUT AND PROCESS OF MAKING THE SAME
Filed Nov. 17, 1930
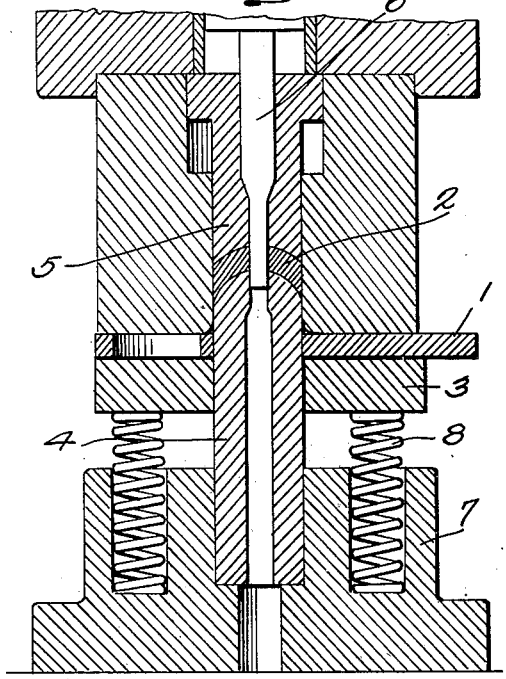
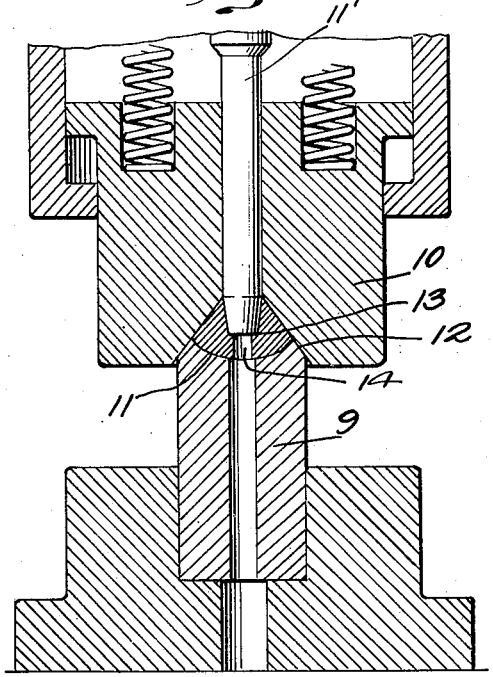
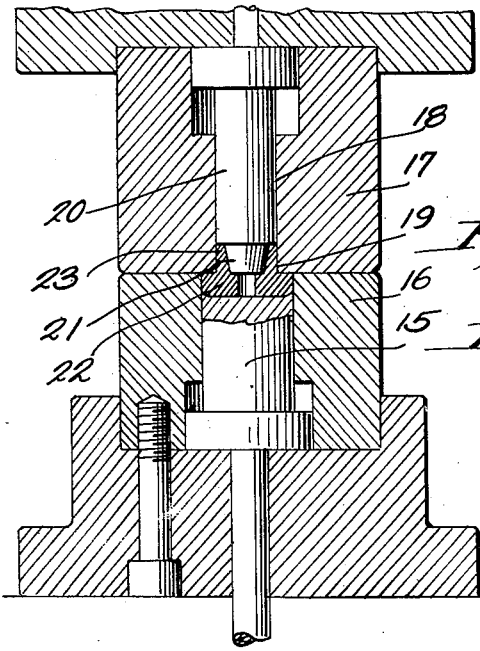
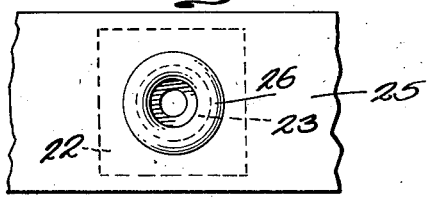
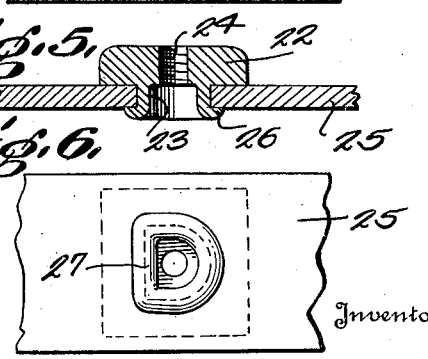
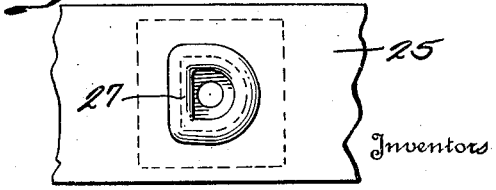
Inventors
Jason A. Fitch and
Clifford D. Watson
By Milans & Milans
Attorneys Patented Feb. 13, 1934

1,946,618

UNITED STATES PATENT OFFICE 1,946,618

NUT AND PROCESS OF MAKING THE SAME

Jason A. Fitch and Clifford D. Watson, Youngstown, Ohio

Application November 17, 1930
Serial No. 496,262

6 Claims. (Cl. 10—86)

Our invention relates to new and useful improvements in nuts and the process of making the same and more particularly to a nut of what may be termed the "clincher" type in which a protrusion or projection is formed on one face whereby the nut may be secured to a plate or other suitable object, and the process or method of making the nut with the stated projection or protrusion.

The principal object of the invention resides in the provision of a novel process or method wherein a protrusion or flange may be formed on one face of a nut in which a relatively small threaded opening is formed.

A further object of our invention resides in the provision of a nut having a relatively small threaded opening therethrough and a projection or protrusion extending from one face of the nut and surrounding the threaded opening, the projection or protrusion acting as means for securing the nut to a plate or other desired object having an opening through which the projection or protrusion is positioned and its end offset to engage the opposite face of the plate or other object thus forming what may be termed a clinch or rivet connection between the nut and plate.

With the above and other objects in view, which will appear as the description proceeds, our invention consists in the novel details of construction, and arrangement of parts, described in the following specification and illustrated in the accompanying drawing, and while we have illustrated and described the preferred embodiments of the invention, as they now appear to us, it will be understood that such changes may be made as will fall within the scope of the appended claims.

In the drawing:—

Fig. 1 illustrates a vertical section through suitable dies, with parts shown in elevation, for carrying forward the first step of our process or method.

Fig. 2 shows a vertical section through suitable dies, with parts shown in elevation, for carrying forward the second step of our process or method.

Fig. 3 is a vertical section through suitable dies, with parts shown in elevation, for carrying forward the third step in our process or method.

Fig. 4 is a plan view of a strip of material showing our improved form of nut secured in position.

Fig. 5 is a longitudinal vertical section through the strip and nut shown in Fig. 4; and Fig. 6 is a view similar to Fig. 4 showing a slightly modified form of nut secured to a strip or plate.

Our improved form of nut is formed on a suitable punch press and we wish it understood that we are not limited to the type of press or presses indicated in Figs. 1, 2 and 3 of the drawing, but these forms have merely been shown for illustrative purposes and for showing the steps in carrying forth our process or method. The nut will preferably be formed from strip steel and the formed nut is particularly adapted for use in automobile body work where it is desired to secure the nut to a strip of material and the present process or method is particularly adapted for forming the nut with an opening of relatively small diameter.

In Fig. 1 of the drawing we have illustrated the first step in the process of forming our nut and in which a blank is punched from a strip of material shown at 1 and pressed into cup-shape as indicated at 2. The strip of material is shown as supported by the spring pressed bed 3 and the blank is forced from the strip by the punch 4 and shaped as shown between the punch 4 and die member 5. An opening of relatively small diameter is formed through the blank 2 by means of a punch 6 and at 7 we have illustrated a base which carries the springs 8 supporting the bed 3. In the next step of our method or process the cupped blank 2 is positioned on the die member 9 shown in Fig. 2 and then shaped by the plunger 10 and punch 11'. The die 9 is formed at the top with a concaved recess 11 conforming to the convex curvature of the blank and the plunger 10 is formed on its bottom surface with a substantially cone-shaped recess 12 which cooperates with the die member 9 to form the nut blank into substantial cone-shape as shown in Fig. 2. The end of the punch 11' forms a recess in the upper surface of the cone-shaped blank, above and of greater diameter than the opening 14 formed by the punch 6 in the first step of forming the blank. After completing the step shown in Fig. 2 the cone-shaped blank is placed upon the plunger 15 shown in Fig. 3 of the drawing which is positioned within a central opening formed in a die member 16. A cooperating die member is shown at 17 and is provided with an opening 18 of less diameter than the opening in the die member 16 to form a shoulder 19 for a purpose which will be later apparent. A plunger 20 is positioned within the opening 18 of the die member 17 and is adapted for sliding movement therein, this plunger 20 having a reduced tapered extension 21 adapted to be received in the recess 13 of the cone-shaped blank formed in Fig. 2. As shown more particularly in Fig. 3 of the drawing the opposed faces of the die members 16 and 17 are brought together and by operating the plungers 15 and 20 the cone-shaped blank shown in Fig. 2 will be pressed into the shape shown in Fig. 3 to provide the nut 22 having the projection or protrusion 23 from one face. As a further step in our process the opening 14 will be threaded as shown at 24 in Fig. 5 of the drawing.

The nut formed by our improved process or method is adapted to be secured to a strip of material such as is shown at 25, the strip having an opening to receive the projection or protrusion 23 of the nut as shown more particularly in Fig. 5. The outer end of the projection or protrusion will be offset as shown at 26 to rivet or secure the nut to the strip. The protrusion or projection 23 shown in Figs. 4 and 5 of the drawing is of circular formation but at times it is desired to have the same of irregular shape to prevent any possibility of the nut rotating relative to the strip to which it is secured. For this purpose we have shown in Fig. 6 a form of nut in which the projection or protrusion is of D-shape adapted to be received in a similarly shaped recess or opening formed in the strip. The D-shaped projection or protrusion is shown at 27 in Fig. 6 of the drawing, the end of the same being offset for securing to the strip.

From the above detailed description it is thought that the manner of forming our nut will be clearly understood as well as the manner in which the nut will be used. The method employed in forming the nut is of particular advantage where it is desired to have a relatively small opening through a nut which has a projection or protrusion from one face whereby the same may be secured to a strip or material or to other members. We are aware that it has previously been suggested to form a projection on the face of a nut, by forcing certain of the material from the blank and then forming an opening therethrough. Such a method is shown in our copending application filed June 23, 1930, Serial No. 463,196, but we have found that the method illustrated in this application is not particularly adapted for forming a nut having a relatively small opening therethrough. In carrying forward a method similar to that disclosed in our pending application where a relatively small opening is to be provided in a nut sufficient material would not be punched or forced from the blank, in forming the relatively small opening, to allow for a projection or protrusion of sufficient size to enable the nut to be secured to a plate or similar strip by the projection or protrusion: In our method described above the material is pressed into such a form as to place a portion thereof in the exact place that the extension or protrusion is to be located. In other words by forming the blank into the cone-shape shown in Fig. 2 the material at the apex of the cone is in the exact position that the projection or protrusion is to be. The material at the apex of the cone is shaped, as shown in Fig. 3 of the drawing, to form the projection or protrusion 23 on the face of the nut. In our present process the projection or protrusion is not formed by punching or forcing material from a blank but the blank is so formed as to position material at the exact point that the projection or protrusion is to be formed. While we have described the opening in the nut as being threaded as a last step in our process we wish it understood that we are not limited to this but the threads might be formed in the opening at any step in the method or process found desirable.

Having fully described our invention what we claim as new and desire to secure by Letters Patent is:

1. The process of forming a nut with a projection from one face which consists in initially forming a blank into cup-shape and punching a hole therein, next reshaping the cup-shaped blank into a mass of a shape substantially that of a frustrum of a cone with the top thereof at the point where the projection is to be formed, and finally reshaping the mass into nut formation with the projection from one face thereof.

2. The process of forming a nut with a projection from one face which consists in initially removing a blank from a strip of material and forming the same into cup-shape and punching a hole therein, next reshaping the cup-shaped blank into a mass shaped substantially as a frustrum of a cone with the top formed at the exact point where the projection is to be positioned, and finally reshaping the mass into nut formation with the projection from one face thereof.

3. The process of forming a nut with a projection from one face which consists in initially forming a relatively thin blank into cup-shape, next pressing the cup-shaped blank into a mass shaped substantially as a frustrum of a cone with the upper edge thereof at the point where the projection is to be formed, and finally shaping the mass into nut formation with the projection from one face thereof.

4. The process of forming a nut with a projection from one face which consists in initially forming a relatively thin blank into cup-shape and punching a relatively small opening therein, next pressing the cup-shaped blank into a mass shaped substantially as a frustrum of a cone while maintaining the opening therein and forming a recess in the top of the mass in communication with the opening, and finally shaping the mass into nut formation with a recessed projection from one face thereof.

5. The process of forming a nut with a projection from one face which consists in initially forming a relatively thin blank into cup-shape and punching a relatively small opening therein, next pressing the cup-shaped blank into a mass shaped substantially as a frustrum of a cone while maintaining the opening therein and forming a recess in the top of the mass in communication with the opening, next shaping the mass into nut formation with a recessed projection from one face thereof, and finally threading the relatively small opening.

6. The process of forming a nut which consists in initially forming a blank into cup-shape with a straight vertical outer edge, next pressing the cup-shaped blank into a mass shaped substantially as a frustrum of a cone, and finally shaping the mass into nut formation with a projection from one face.

JASON A. FITCH.
CLIFFORD D. WATSON.